United States Patent
Nolan et al.

(10) Patent No.: US 11,637,771 B2
(45) Date of Patent: Apr. 25, 2023

(54) TECHNOLOGIES FOR MANAGING NETWORK TRAFFIC THROUGH HETEROGENEOUS NETWORKS

(71) Applicant: Intel Corporation, Santa Clara, CA (US)

(72) Inventors: Keith Nolan, Mullingar (IE); Mark Kelly, Leixlip (IE); Michael McGrath, Virginia (IE); Heather King, Dublin (IE); Charlie Sheridan, Ballivor (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/578,191

(22) Filed: Jan. 18, 2022

(65) Prior Publication Data

US 2022/0217080 A1   Jul. 7, 2022

Related U.S. Application Data

(63) Continuation of application No. 16/023,795, filed on Jun. 29, 2018, now Pat. No. 11,258,704.

(51) Int. Cl.
*H04L 45/42* (2022.01)
*H04L 45/122* (2022.01)
(Continued)

(52) U.S. Cl.
CPC ............ *H04L 45/42* (2013.01); *H04L 45/122* (2013.01); *H04L 45/22* (2013.01); *H04L 45/306* (2013.01);
(Continued)

(58) Field of Classification Search
CPC . H04L 63/123; H04L 63/045; H04L 63/0435; H04L 63/0485; H04L 63/0245;
(Continued)

(56) References Cited

U.S. PATENT DOCUMENTS 6,363,319 B1   3/2002   Hsu
6,801,528 B2   10/2004   Nassar
(Continued)

OTHER PUBLICATIONS

United States Patent and Trademark Office, "Notice of Allowance and Fee(s) Due," issued in connection with U.S. Appl. No. 16/023,795, dated Oct. 15, 2021, 5 pages.
(Continued)

*Primary Examiner* — James P Duffy
(74) *Attorney, Agent, or Firm* — Hanley, Flight & Zimmerman, LLC

(57) ABSTRACT

Technologies for managing network traffic through heterogeneous fog network segments of a fog network include a fog node deployed in a fog network segment. The fog node is configured to receive a fog frame that includes control instructions. The fog node is further configured to perform a route selection action to identify a preferred target fog node based on the control instructions, perform action(s) based on the control instructions and network characteristic (s) of the fog network segment relative to corresponding network characteristic(s) of the different fog network segment, and generate updated control instructions based on at least one network characteristic of the different fog network segment. Additionally, the fog node is configured to replace the original control instructions of the received fog frame with the updated control instructions and transmit the received fog frame with the updated control instructions to the preferred target fog node. Other embodiments are described and claimed.

24 Claims, 7 Drawing Sheets

(51) Int. Cl.
*H04L 9/40* (2022.01)
*H04L 67/12* (2022.01)
*H04L 45/50* (2022.01)
*H04L 45/00* (2022.01)
*H04L 45/302* (2022.01)

(52) U.S. Cl.
CPC ........ *H04L 45/502* (2013.01); *H04L 63/0227* (2013.01); *H04L 63/0245* (2013.01); *H04L 63/0485* (2013.01); *H04L 67/12* (2013.01); *H04L 63/045* (2013.01); *H04L 63/0435* (2013.01); *H04L 63/123* (2013.01)

(58) Field of Classification Search
CPC ... H04L 63/0227; H04L 67/12; H04L 45/502; H04L 45/306; H04L 45/22; H04L 45/122; H04L 45/42
See application file for complete search history.

(56) References Cited

U.S. PATENT DOCUMENTS

| | | | |
|---|---|---|---|
| 6,804,201 | B1 | 10/2004 | Gelenbe |
| 11,258,704 | B2 | 2/2022 | Nolan et al. |
| 2003/0014624 | A1 | 1/2003 | Maturana et al. |
| 2007/0115847 | A1 | 5/2007 | Strutt et al. |
| 2007/0214502 | A1* | 9/2007 | McAlister ........... H04L 63/0428 726/15 |
| 2009/0043911 | A1 | 2/2009 | Flammer et al. |
| 2016/0352577 | A1 | 12/2016 | Schiff et al. |
| 2016/0352711 | A1 | 12/2016 | Kohiyama |
| 2017/0048308 | A1 | 2/2017 | Qaisar |

OTHER PUBLICATIONS

United States Patent and Trademark Office, "Advisory Action," issued in connection with U.S. Appl. No. 16/023,795, dated Aug. 6, 2021, 2 pages.

United States Patent and Trademark Office, "Final Office Action," issued in connection with U.S. Appl. No. 16/023,795, dated May 27, 2021, 19 pages.

United States Patent and Trademark Office, "Non-Final Office Action," issued in connection with U.S. Appl. No. 16/023,795, dated Oct. 13, 2020, 20 pages.

United States Patent and Trademark Office, "Final Office Action," issued in connection with U.S. Appl. No. 16/023,795, dated May 28, 2020, 19 pages.

United States Patent and Trademark Office, "Non-Final Office Action," issued in connection with U.S. Appl. No. 16/023,795, dated Oct. 4, 2019, 18 pages.

* cited by examiner

TECHNOLOGIES FOR MANAGING NETWORK TRAFFIC THROUGH HETEROGENEOUS NETWORKS

RELATED APPLICATION

This patent arises from a continuation of U.S. patent application Ser. No. 16/023,795, (Now U.S. Pat. No. 11,258, 704) which was filed on Jun. 29, 2018, which is hereby incorporated herein by reference in its entirety. Priority to U.S. patent application Ser. No. 16/023,795 is hereby claimed.

BACKGROUND

Mobile computing devices, vehicles, appliances, industrial equipment, and other types of Internet-enabled devices are becoming seemingly ubiquitous. Oftentimes, such devices have limited power and compute resources. Accordingly, those devices generally offload certain data such that computational workloads can be performed remotely (e.g., at the edge, at the cloud, etc.). Such offloading typically relies on wireless communication technologies for transferring collected information to the remote resources and receiving computational result information therefrom. While modern computing systems continue to trend toward cloud-based servers performing the necessary computations/storage and a wireless network infrastructure to facilitate the transfer of data, it may not always be desirable or even feasible for network traffic to be handled in such end-to-end sessions.

For example, fog networks residing between the edge and the cloud may allow for multiple route options and include multiple network traffic egress points. However, fog networks are oftentimes comprised of multi-owner mixed infrastructure networks. In other words, fog networks can be quite different than traditional homogeneous Internet Protocol (IP) end-to-end networks. Additionally, the routing paths through fog networks may be dynamic in nature, such as in vehicular usage applications. As such, security, quality of service (QoS), or other performance-related compliance requirements may be difficult to implement and/or enforce due to the dynamic nature and unknown, mixed infrastructure of fog networks.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
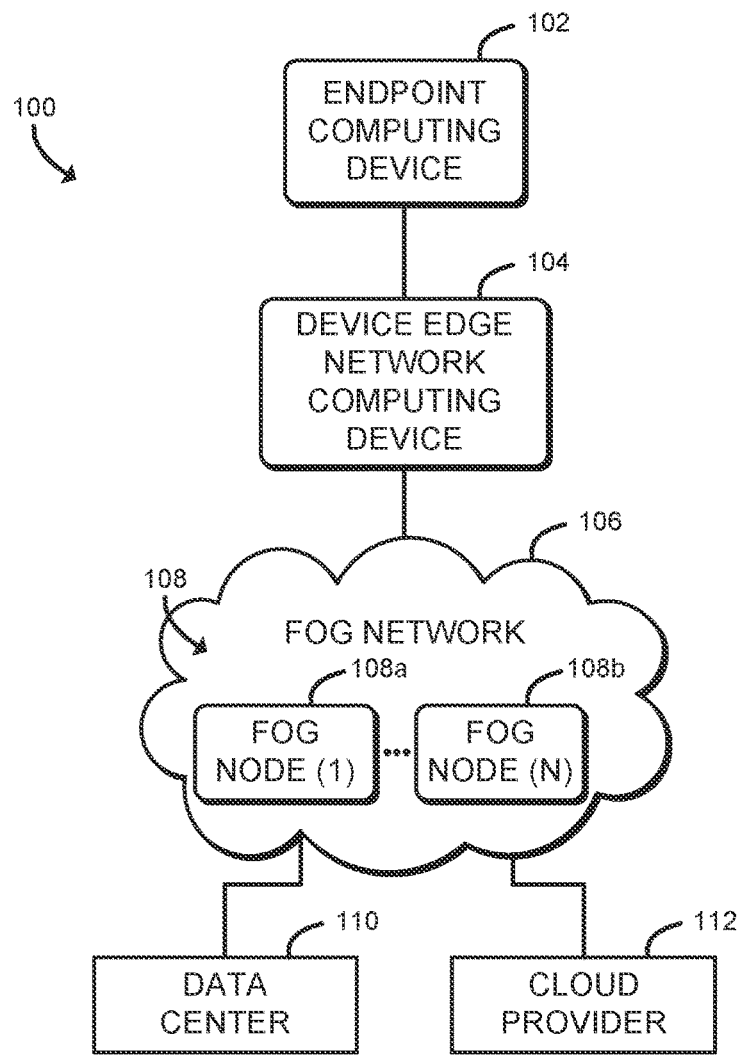
FIG. 1 is a simplified block diagram of at least one embodiment of a system for managing network traffic through heterogeneous fog networks that include multiple fog nodes.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for managing network traffic through heterogeneous fog networks includes a plurality of fog nodes 108 of the fog network 106. The system additionally includes an endpoint computing device 102 communicatively coupled to a device edge network computing device 104. While illustratively shown as having a single endpoint computing device 102 and a single device edge network computing device 104, it should be appreciated that the system 100 may include multiple endpoint computing device 102, in other embodiments. Similarly, it should be appreciated that, in other embodiments, the system 100 may include multiple device edge network computing devices 104, in other embodiments. Additionally, in some embodiments, each device edge network computing device 104 may have multiple endpoint computing devices 102 being communicatively connected thereto.

In use, an application running on an endpoint computing device 102 performs certain actions based on the intended use of the application. It should be appreciated that, in some embodiments, the endpoint computing device 102 may not be the optimal device to store or perform the necessary compute operation(s). For example, this may be attributable to a lack of sufficient compute power, battery power, and/or storage space available on the endpoint computing device 102, a need to leverage additional/externally sourced information, and/or simply that the compute operation(s) are not supported by the platform (i.e., the hardware/software resources) of the endpoint computing device 102. Accordingly, the endpoint computing device 102 may be configured to collect (e.g., via a sensor (not shown) of the endpoint computing device 102), generate, or otherwise obtain data that is to be wirelessly transmitted via a network packet to a remote computing device (e.g., housed in a data center 110, a cloud provider 112, or some other remotely located computing device storage location) for storage and/or computation operations to be performed thereon.

Initially, the endpoint computing device 102 generates the network packet, which includes at least a portion of the data in a payload of the network packet, and transmits the payload packet to the device edge network computing device 104. The device edge network computing device 104 then forwards the network packet to an ingress point (e.g., a fog node 108) of a segment of the fog network 106 (see, e.g., the fog network segments 802 of the illustrative fog network 106 of FIG. 8). It should be appreciated that, during transmission of the network packet, the network packet may be transmitted through multiple fog nodes of multiple fog network segments before reaching an egress point of one segment of the fog network 106. It should be further appreciated that one or more of the fog network segments may be dynamic, owned by different entities, and/or support different network protocols (e.g., support different security protocols, communication protocols, etc.). In other words, the fog network segments are oftentimes a heterogeneous mixture of fog nodes 108 whose paths therebetween and availability thereof can change rapidly and without notice. Accordingly, unlike traditional networks, an end-to-end session may not be easily established or maintained for transmission of the network packets.

As described in further detail below, each of the fog nodes 108, or at least the fog nodes 108 at an ingress and/or egress point of the associated fog network segments, are configured to facilitate the forwarding of network traffic through the fog network segments of the fog network 106, agnostic of the underlying protocols and security approaches enforced by any individually-controlled fog network segments of the fog network 106 along a particular route therethrough. To do so, the fog nodes 108 are configured to construct fog frames which encapsulate at least a portion of the received payload and provide network control instructions for each fog frame. The network control instructions are usable by the receiving fog nodes 108 to dynamically control the fog frames in-transit through the fog network 106 based on the decision logic associated with the network control instructions. Additionally, the fog nodes 108 are configured to collect routing/path statistics usable to evaluate the transit paths taken across multiple fog network segments by the fog frames and, under certain conditions, to identify those paths which are in compliance with security, quality of service (QoS), or other performance-related compliance requirements.

As described previously, in some embodiments, at least a portion of the data transmitted to the device edge network computing device 104 may be forwarded to other compute and/or storage devices for which compute operation(s) may be executed thereon and/or the longer-term storage thereof may be managed, such as by the data center 114 or the cloud provider 112. Accordingly, at least one of the fog network segments may have an egress point to a backhaul and/or core network (not shown) which allows access to the Internet. Such networks may be embodied as any number of various wired (e.g., Ethernet) and/or wireless networks. It should be appreciated that such networks may include wired and/or wireless communication paths (e.g., the illustrative network segment connecting interconnects of FIG. 1, as well as those not illustratively shown within each network segment) configured to communicatively couple two or more computing devices (e.g., the device edge network computing device 104, the fog nodes 108, etc.), which may be embodied as wired interconnects, wireless communication channels, or a combination thereof, depending on the embodiment.

For example, such networks may be embodied as, or otherwise include, a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. As such, it should be appreciated that one or more of the fog network segments may be communicatively coupled to any number of additional networked devices, such as additional computers, routers, switches, access points, etc., to facilitate communications among the devices of the system 100. It should be appreciated that the communications protocol(s) employed may be consistent with the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the standards under development by the OpenFog Consortium, the optimized link state routing (OLSR) Protocol, or the better approach to mobile ad-hoc networking (B.A.T.M.A.N.), among many others.

The endpoint computing device 102 may be embodied as any type of connected device, such as, without limitation, a mobile computing device (e.g., a smartphone, a tablet computer, a laptop computer, a notebook computer, etc.), an Internet of Things (IoT) device (e.g., a wearable device, a smart home device, a smart vehicle, etc.), an embedded device, or any other type of device capable of transmitting network packets into a fog network 106 (e.g., via the device edge network computing device 104). While not illustratively shown, it should be appreciated that, depending on the embodiment, the endpoint computing device 102 may include one or more sensors and/or actuators. For example, the sensor(s) may be include, but are not limited to, a motion sensor, an image sensor, a position sensor, a temperature sensor, a humidity sensor, a power sensor, an environmental sensor, a building management sensor, a building automation sensor, a radar sensor, a vision sensor, or any other type of sensor.

Each of the fog nodes 108 may be embodied as any type of computing node capable of providing resources for fog computing/services (e.g., in a fog network 106), such as a server (e.g., stand-alone, rack-mounted, blade, etc.), a sled (e.g., a compute sled, an accelerator sled, a storage sled, a memory sled, etc.), an enhanced network interface controller (NIC) (e.g., a HFI), a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a wireless access point, a web appliance, a distributed computing system, an accelerator-based system, a processor-based system, and/or a multiprocessor system capable of performing the functions described herein.

Figure 2:
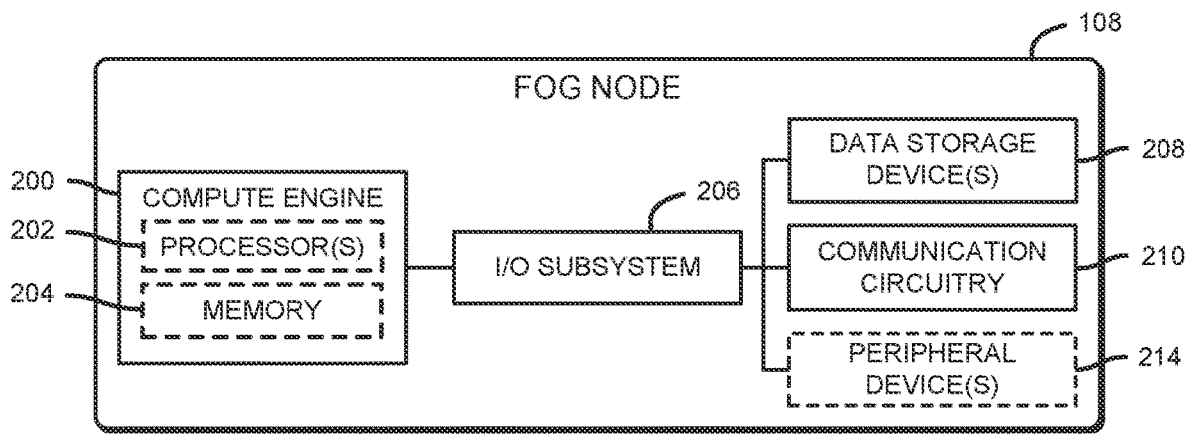
FIG. 2 is a simplified block diagram of at least one embodiment of a fog node of the system of FIG. 1.

Referring now to FIG. 2, an illustrative fog node 108 is shown which includes a compute engine 200, an I/O subsystem 206, one or more data storage devices 208, communication circuitry 210, and, in some embodiments, one or more peripheral devices 212. It should be appreciated that the fog node 108 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 200 may be embodied as any type of device or collection of devices capable of performing the various compute functions as described herein. In some embodiments, the compute engine 200 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 200 may include, or may be embodied as, one or more processors 202 (i.e., one or more central processing units (CPUs)) and memory 204.

The processor(s) 202 may be embodied as any type of processor capable of performing the functions described herein. For example, the processor(s) 202 may be embodied as one or more single-core processors, one or more multi-core processors, a digital signal processor, a microcontroller, or other processor or processing/controlling circuit(s). In some embodiments, the processor(s) 202 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The memory 204 may be embodied as any type of volatile (e.g., dynamic random access memory (DRAM), etc.) or non-volatile memory or data storage capable of performing the functions described herein. It should be appreciated that the memory 204 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 200 is communicatively coupled to other components of the fog node 108 via the I/O subsystem 206, which may be embodied as circuitry and/or components to facilitate input/output operations with the processor 202, the memory 204, and other components of the fog node 108. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the processor 202, the memory 204, and other components of the fog node 108, on a single integrated circuit chip.

The one or more data storage devices 208 may be embodied as any type of storage device(s) configured for short-term or long-term storage of data, such as, for example, memory devices and circuits, memory cards, hard disk drives, solid-state drives, or other data storage devices. Each data storage device 208 may include a system partition that stores data and firmware code for the data storage device 208. Each data storage device 208 may also include an operating system partition that stores data files and executables for an operating system.

The communication circuitry 210 may be embodied as any communication circuit, device, or collection thereof, capable of enabling communications between the fog node 108 and other computing devices (e.g., other fog nodes 108, the device edge network computing device 104, etc.), as well as any network communication enabling devices, such as an access point, network switch/router, etc., to allow communication over the fog network 106. Accordingly, the communication circuitry 210 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

The communications circuitry 210 may use any number of 3GPP (Third Generation Partnership Project) specifications, notably Long Term Evolution (LTE), Long Term Evolution-Advanced (LTE-A), and Long Term Evolution-Advanced Pro (LTE-A Pro). It should be appreciated that such exemplary scenarios are demonstrative in nature, and accordingly may be similarly applied to other mobile communication technologies and standards, such as any Cellular Wide Area radio communication technology, which may include e.g. a 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, IEEE802.11ax, IEEE802.11p, IEEE 802.11ah, IEEE 802.15.4, in addition to 802.3 Ethernet, IEEE 802.1 time sensitive networking etc., LoRaWAN as developed by the Lora Alliance, Sigfox, Random Phase Multiple Access as developed by Ingenu), etc.

It should be appreciated that, in some embodiments, the communication circuitry 210 may include specialized circuitry, hardware, or combination thereof to perform pipeline logic (e.g., hardware algorithms) for performing the functions described herein, including applying the hash functions, processing network packets (e.g., parse received network packets, determine destination computing devices for each received network packets, forward the network packets to a particular buffer queue of a respective host buffer of the fog node 108, etc.), performing computational functions, etc.

In some embodiments, performance of one or more of the functions of communication circuitry 210 as described herein may be performed by specialized circuitry, hardware, or combination thereof of the communication circuitry 210, which may be embodied as a system-on-a-chip (SoC) or otherwise form a portion of a SoC of the fog node 108 (e.g., incorporated on a single integrated circuit chip along with a processor 202, the memory 204, and/or other components of the fog node 108). Alternatively, in some embodiments, the specialized circuitry, hardware, or combination thereof may be embodied as one or more discrete processing units of the fog node 108, each of which may be capable of performing one or more of the functions described herein.

The one or more peripheral devices 212 may include any type of device that is usable to input information into the fog node 108 and/or receive information from the fog node 108. The peripheral devices 212 may be embodied as any auxiliary device usable to input information into the fog node 108, such as a keyboard, a mouse, a microphone, a barcode reader, an image scanner, etc., or output information from the fog node 108, such as a display, a speaker, graphics circuitry, a printer, a projector, etc. It should be appreciated that, in some embodiments, one or more of the peripheral devices 212 may function as both an input device and an output device (e.g., a touchscreen display, a digitizer on top of a display screen, etc.). It should be further appreciated that the types of peripheral devices 212 connected to the fog node 108 may depend on, for example, the type and/or intended use of the fog node 108. Additionally or alternatively, in some embodiments, the peripheral devices 212 may include one or more ports, such as a USB port, for example, for connecting external peripheral devices to the fog node 108.

Referring back to FIG. 1, the device edge network computing device 104 may be embodied as, without limitation, a gateway, one or more servers (including, e.g., stand-alone server(s), rack-mounted server(s), blade server(s), etc.), a network appliance (e.g., a multi-access edge computing (MEC) appliance), a distributed computing system, or any other combination of compute/storage device(s) capable of performing the functions described herein. In some embodiments, the device edge network computing device 104 may form a portion of the European Telecommunications Standards Institute's (ETSI's) Multi-Access Edge Computing (MEC) edge of a mobile network or cellular network (e.g., Global System for Mobile Communications (GSM), Long-Term Evolution (LTE), 5G, etc.).

It should be appreciated that, in some embodiments, the device edge network computing device 104 may itself be considered a fog computing device and/or form a portion of a fog network segment (e.g., an entry point thereof), depending on the implementation and function associated therewith. Accordingly, it should be further appreciated that the device edge network computing device 104 may include similar and/or like components to those of the illustrative fog node 108 of FIG. 2, such as a compute engine (e.g., with one or more processors and memory, an I/O subsystem, one or more data storage devices, communication circuitry, etc. As such, figures and descriptions of the similar/like components are not repeated herein for clarity of the description with the understanding that the description of the corresponding components provided above in regard to the illustrative fog node 108 of FIG. 2 applies equally to the corresponding components of the device edge network computing device 104. Of course, it should be appreciated that the respective computing devices may include additional and/or alternative components, depending on the embodiment.

Figure 3:
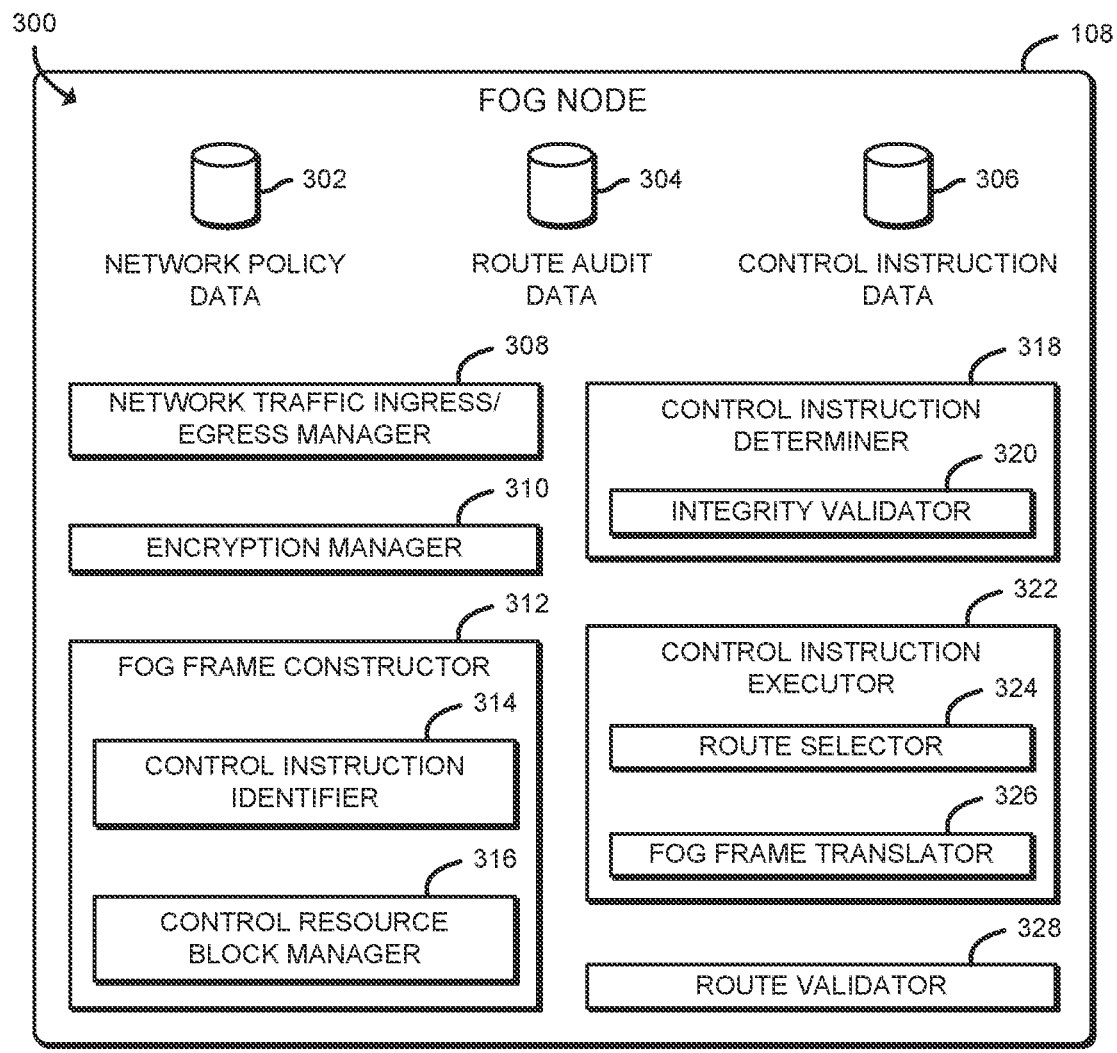
FIG. 3 is a simplified block diagram of at least one embodiment of one of the fog nodes of the system of FIG. 1.

Referring now to FIG. 3, in an illustrative embodiment, one of the fog nodes 108 establishes an environment 300 during operation. The illustrative environment 300 includes a network traffic ingress/egress manager 308, an encryption manager 310, a fog frame constructor 312, a control instruction determiner 318, a control instruction executor 322, and a route validator 328. The various components of the environment 300 may be embodied as hardware, firmware, software, or a combination thereof. As such, in some embodiments, one or more of the components of the environment 300 may be embodied as circuitry or collection of electrical devices (e.g., network traffic ingress/egress management circuitry 308, encryption management circuitry 310, fog frame construction circuitry 312, control instruction determination circuitry 318, control instruction execution circuitry 322, route validation circuitry 328, etc.).

It should be appreciated that, in such embodiments, one or more of the network traffic ingress/egress management circuitry 308, the encryption management circuitry 310, the fog frame construction circuitry 312, the control instruction determination circuitry 318, the control instruction execution circuitry 322, and the route validation circuitry 328 may form a portion of one or more of the compute engine 200, the I/O subsystem 206, the communication circuitry 210, and/or other components of the fog node 108. Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the compute engine 200 or other components of the fog node 108. It should be appreciated that the fog node may include other components, sub-components, modules, sub-modules, logic, sub-logic, and/or devices commonly found in a computing device, which are not illustrated in FIG. 3 for clarity of the description.

In the illustrative environment 300, the fog node 108 additionally includes network policy data 302, route audit data 304, and control instruction data 306, each of which may be accessed by the various components and/or sub-components of the fog node 108. Additionally, it should be appreciated that in some embodiments the data stored in, or otherwise represented by, each of the network policy data 302, the route audit data 304, and the control instruction data 306 may not be mutually exclusive relative to each other. For example, in some implementations, data stored in the network policy data 302 may also be stored as a portion of one or more of the route audit data 304 and/or the control instruction data 306. As such, although the various data utilized by the fog node 108 is described herein as particular discrete data, such data may be combined, aggregated, and/or otherwise form portions of a single or multiple data sets, including duplicative copies, in other embodiments.

The network traffic ingress/egress manager 308, which may be embodied as hardware, firmware, software, virtualized hardware, emulated architecture, and/or a combination thereof as discussed above, is configured to receive inbound and route/transmit outbound network traffic. To do so, the network traffic ingress/egress manager 308 is configured to facilitate inbound/outbound network communications (e.g., network traffic, network packets, fog frames, etc.) to and from the fog node 108. For example, the network traffic ingress/egress manager 308 is configured to manage (e.g., create, modify, delete, etc.) connections to physical and virtual network ports (i.e., virtual network interfaces) of the fog node 108 (e.g., via the communication circuitry 210), as well as the ingress/egress buffers/queues associated therewith. Additionally, the network traffic ingress/egress manager 308 is configured to implement explicit per-packet routing decision logic for fine-grained control and policies, such as may be enforced within the fog network segment of the fog network 106 in which the fog node 108 is deployed.

The encryption manager 310, which may be embodied as hardware, firmware, software, virtualized hardware, emulated architecture, and/or a combination thereof as discussed above, is configured to encrypt at least a portion of a network packet (e.g., a payload of the network packet). In some embodiments, the encryption manager 310 may be configured to apply an inner and/or outer encryption/decryption scheme. To do so, the encryption manager 310 is configured to select the encryption scheme to be used by the outer encryption process, such as may be selected based on a network policy (e.g., stored in the network policy data 302) associated with the received network packet. For example, the outer encryption scheme may be a symmetric encryption process which is applied by the owner/controller of a fog network segment of a fog network 106 (see, e.g., the fog network segments 802 of the illustrative fog network 106 of FIG. 8). The encryption manager 310 may be configured to apply any type of outer encryption scheme on a received network packets, such as any IP security (IPSec) encryption standard, secure sockets layer (SSL), transport layer security (TLS), elliptic curve cryptography (ECC), Advanced Encryption Standard (AES), data encryption standard (DES), a stream cipher, Rivest-Shamir-Adleman (RSA), etc.

It should be appreciated that, in some embodiments, inner-encryption may not be enabled or otherwise supported. Accordingly, the encryption manager 310 is configured to determine whether inner-encryption is enabled. For example, the fog frame may include an indication flag using a status bit (e.g., set by the originator of the network packet at the ingress point of the fog network 106) which is readable by the encryption manager 310 to determine whether inner-encryption is enabled or disabled. If enabled, the encryption manager 310 is configured to select the inner encryption scheme to be used by the inner encryption process, such as may be selected based on a network policy (e.g., stored in the network policy data 302) associated with the received network packet. In some embodiments, the encryption manager 310 may be additionally configured to support decryption of the outer and/or inner network packet encryption.

The fog frame constructor 312, which may be embodied as hardware, firmware, software, virtualized hardware, emulated architecture, and/or a combination thereof as discussed above, is configured to generate fog frames. To do so, the fog frame constructor 312 is configured to generate a fog frame header that includes an identifier of the originating source of the network packet (e.g., the endpoint computing device 102). The illustrative fog frame constructor 312 includes a control instruction identifier 314 and a control resource block manager 316.

The control instruction identifier 314 is configured to identify which control instructions are associated with the generated fog frame, such as may be based on a network policy (e.g., stored in the network policy data 302) and/or one or more network characteristics (e.g., available security, QoS metrics, supported protocols, etc.) of the fog network segment in which the fog node 108 resides. Such control instructions may include any information usable to identify one or more actions to be undertaken by a receiving fog node 108. In some embodiments, for example, the fog network control instructions may control basic functionality, such as whether to allow and block a particular fog frame. Additionally or alternatively, in other embodiments, the fog network control instructions may be extended to support more complex instructions, such as prioritizing higher priority traffic based on QoS (e.g., transmission success rate, throughput, etc.) versus latency selection when making routing decisions, IP to non-IP packet transformation, non-IP to IP packet transformation, and dynamic time-to-live (TTL) control, for example. Accordingly, such fog network control instructions may include, but are not limited to, an allowed (i.e., white-listed) protocol identifier, a blocked (i.e., black-listed) protocol identifier, a TTL deadline, a flag to enable/disable compression when translating protocols, an indication to favor (i.e., give a higher priority) to higher QoS routes, an indication to favor (i.e., give a higher priority) to lower latency routes, or an indication that IP to non-IP translation capability is enabled, allowed, or supported.

It should be appreciated that, over the course of being transmitted through a fog network 106, the fog network control instructions may change (e.g., between fog network segments, within fog network segments, etc.). Accordingly, the control instruction identifier 314 is additionally configured to identify any instructions which are to be updated. To do so, the control instruction identifier 314 is configured to obtain the present set of control instructions (e.g., packet routing strategy, QoS preference, latency preference, etc.) of the received fog frame for which the control instructions are to be updated and identify which of those control instructions are to be updated.

The control instruction identifier 314 is further configured to retrieve feedback information associated with previous fog frame transmission attempts, rank the control instructions, and generate an updated control instruction list which can then be encoded and packaged into a to be transmitted fog frame (e.g., by the control resource block manager 316). In some embodiments, the control instruction identifier 314 may be configured to perform a ranking process which implements one or more de-ranking strategies, wherein a number of fog nodes reported a transmission failure. In such embodiments, the decision process for each control instruction for determining whether to de-rank a particular control instruction may be determined as a function of a de-ranking threshold, an amount of fog nodes classified as decider fog nodes (i.e., fog nodes that direct the actions of other fog nodes), and a current ranking of that control instruction.

The control resource block manager 316 is configured to generate a fog control resource block of the fog frame. To do so, the control resource block manager 316 is configured to encode and package the associated control instructions, such as may be identified by the control instruction identifier 314. Additionally, the control resource block manager 316 is configured to generate a checksum of the packaged control instructions. The control resource block manager 316 is further configured to generate the fog control resource block to include the packaged control instructions and the generated checksum.

The fog frame constructor 312 is further configured to append the encrypted network packet payload (i.e., from a network packet received at an ingress of the fog network 106) to the fog frame header generated and append the generated fog control resource block to the appended payload of the fog frame. Additionally, the fog frame constructor 312 is configured to enqueue the generated fog frame for transmission to one or more target nodes (e.g., another fog node 108, an access point, etc.).

The control instruction determiner 318, which may be embodied as hardware, firmware, software, virtualized hardware, emulated architecture, and/or a combination thereof as discussed above, is configured to determine one or more control instructions of a received fog frame that, as described previously, are used to dynamically control packets in transit through the fog networks. As described above, each fog frame includes one or more control instructions. Accordingly, the control instruction determiner 318 is configured to identify which control instructions are included in a fog control resource block the fog frame. To do so, the control instruction determiner 318 is configured to extract the packaged control instruction(s) and checksum from the fog control resource block of a received fog frame. The illustrative control instruction determiner 318 includes an integrity validator 320. The integrity validator 320 is configured to validate the integrity of the packaged control instruction(s) using the extracted checksum. If successfully validated, the control instruction determiner 318 is further configured to identify which action(s) are to be performed as a function of the validated control instruction(s).

The control instruction executor 322, which may be embodied as hardware, firmware, software, virtualized hardware, emulated architecture, and/or a combination thereof as discussed above, is configured to execute the actions associated with the control instructions associated with a received fog frame, such as may be determined by the control instruction determiner 318. To do so, the illustrative control instruction executor 322 includes a route selector 324 and a fog frame translator 326. The route selector 324 is configured to identify available routes into, through, and out of each fog network segment a fog network 106. To do so, the route selector 324 may be configured to determine the objective(s) of the fog frame (e.g., based on a corresponding control instruction) and determine which route option matches the determined objective(s) (e.g., low latency, high QoS, implemented security, etc.). The fog frame translator 326 is configured to convert, or otherwise transform, an IP supported fog frame to a non-IP supported fog frame, or vice versa, such as may be required in a particular fog network segment. Accordingly, the fog frame translator 326 may be configured to perform one or more translation/transformation operations on the fog frame, such as address compression (e.g., robust header compression (RoHC), Static Context Header Compression (SCHC), etc.), field eliding, and payload transfer.

The route validator 328, which may be embodied as hardware, firmware, software, virtualized hardware, emulated architecture, and/or a combination thereof as discussed above, is configured to collect statistical data related to previously chosen routes/paths for fog frames transmitted through the network and validate available routes that could be taken through a fog network based on the collected statistical data. It should be appreciated that fog frames are typically transmitted through the fog network segments over unreliable or unknown paths in a given fog network 106. Accordingly, the route validator 328 is configured to evaluate the transit routes taken across multiple fog network segments of the fog network 106 by previously transmitted fog frames.

As such, the route validator 328 may be configured to identify which paths best comply with certain requirements associated with that particular type (e.g., associated flow, workload type, source, destination, etc.) of fog frame, such as security requirements, QoS requirements, or other performance related requirements (e.g., transit times, fog frame processing instruction compliance rates, etc.). For example, the route validator 328 may be configured to drop a fog frame if a mission-critical connection cycle time cannot be achieved. In another example, the route validator 328 may be configured to select one path over another based on whether a preference of one protocol associated with one path is preferable over another path option, whether the selection of a low latency path rather than a more costly higher quality of service route option is preferable, etc.

Additionally, the route validator 328 is further configured to collect information usable to select make subsequent route selections (e.g., by the route selector 324). For example, the route validator 328 may be configured to record whether transmission of the fog frame was successful. To do so, the route validator 328 may be configured to increment a counter indicative of a successful transmission upon making the determination that the fog frame was successfully transmitted. Additionally or alternatively, the route validator 328 may be configured to increment a counter indicative of an unsuccessful transmission upon making the determination that the fog frame was not successfully transmitted.

Figure 4:
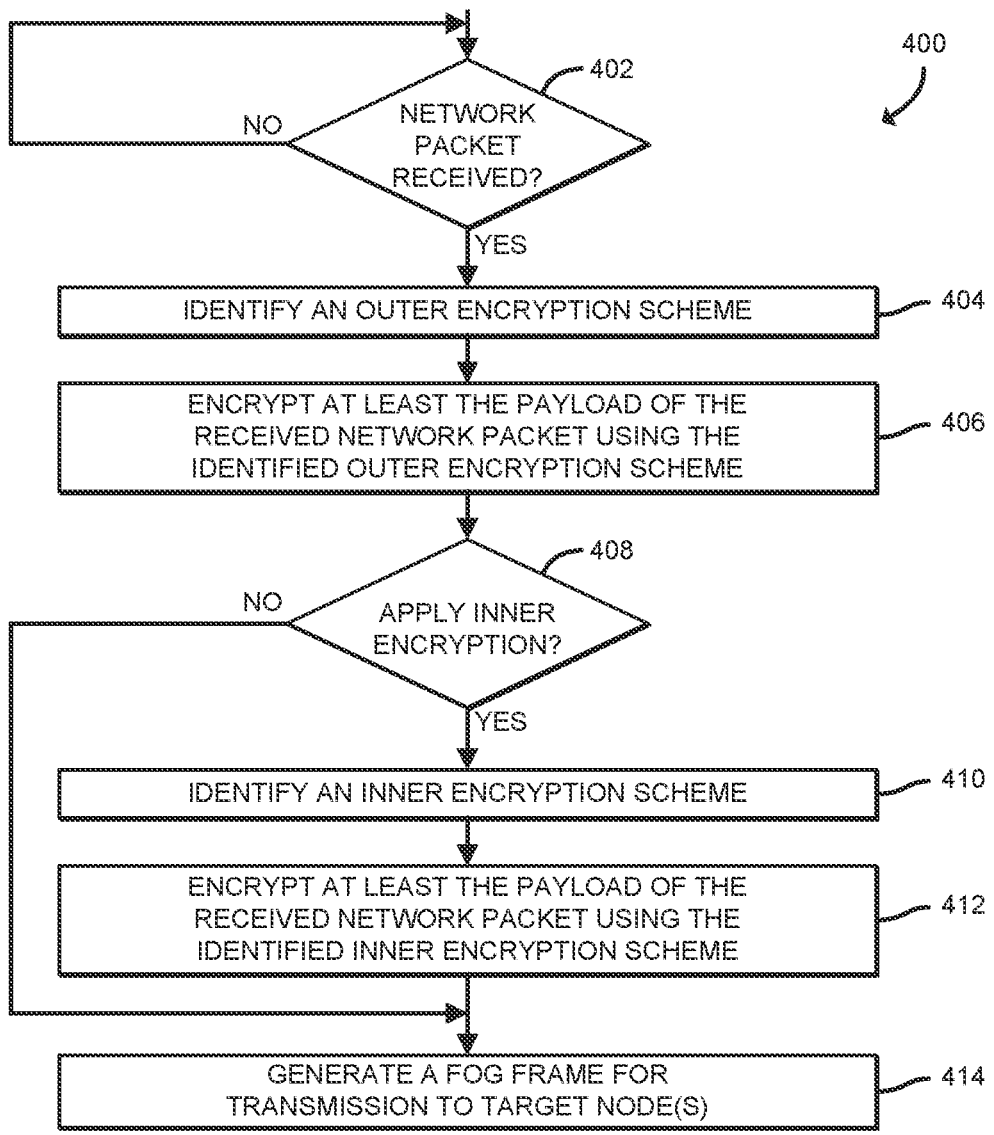
FIG. 4 is a simplified flow diagram of at least one embodiment of a method for processing a network packet received at an ingress point of a fog network from an edge network that may be executed by the fog node of FIG. 3.
Figure 8:
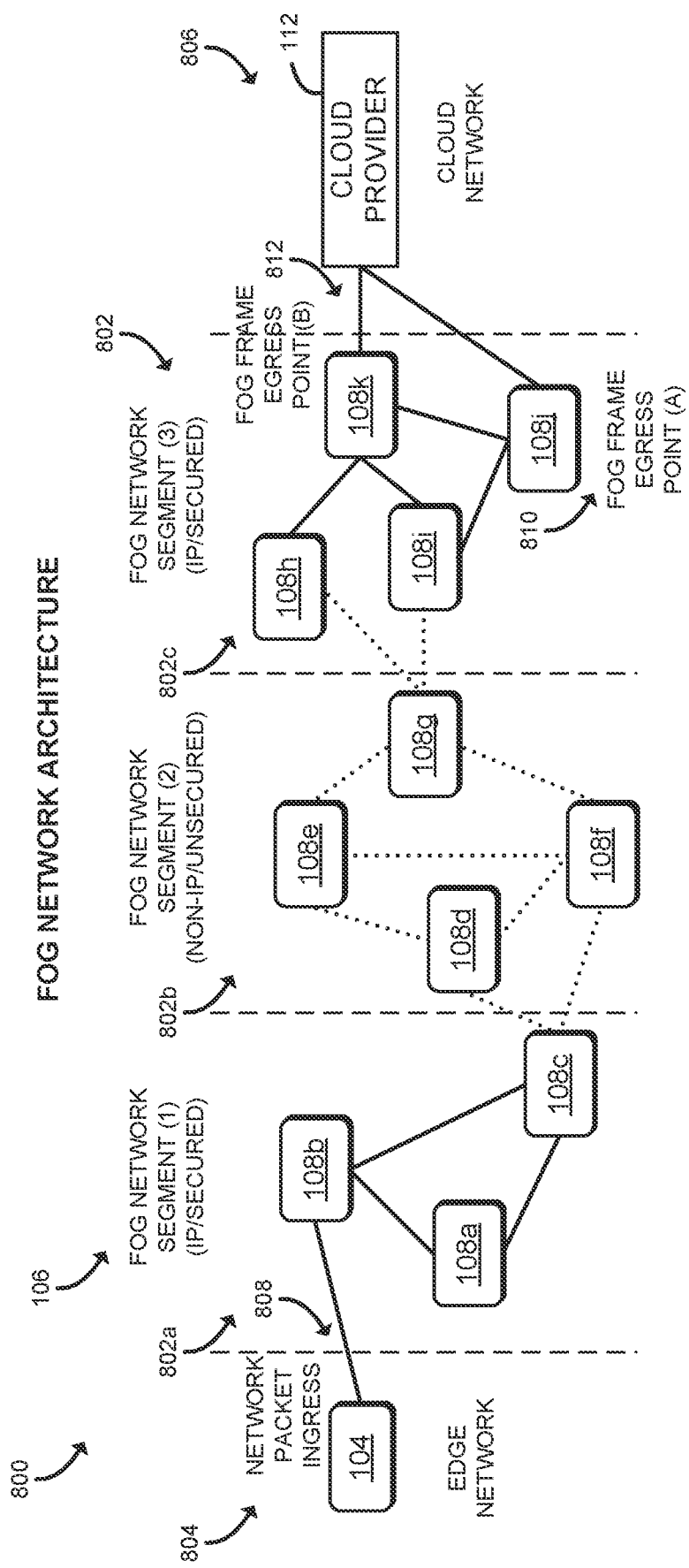
FIG. 8 is a simplified block diagram of at least one embodiment of a fog network architecture that includes multiple heterogeneous fog network segments, each including multiple fog nodes.

Referring now to FIG. 4, a method 400 for processing a network packet received at an ingress point of a fog network from an edge network (e.g., via the device edge network computing device 104 of FIG. 1) is shown which may be executed by a fog node 108 (e.g., the fog node 108*b* of FIG. 8). The method 400 begins with block 402, in which the fog node 108 determines whether a network packet has been received. If so, the method 400 advances to block 404, in which the fog node 108 identifies an outer encryption scheme. In block 406, the fog node 108 encrypts at least the payload of the received network packet using the identified outer encryption scheme.

In block 408, the fog node 108 determines whether to apply an inner-encryption. If not, the method 400 jumps to block 414 described below; otherwise, the method 400 advances to block 410. In block 412, the fog node 108 identifies an inner encryption scheme. In block 414, the fog node 108 encrypts at least the payload of the received network packet using the identified inner encryption scheme. In block 414, the fog node 108 generates a fog frame for transmission to one or more target nodes of the fog network 106, which is illustratively described in the method 500 FIG. 5.

Figure 5:
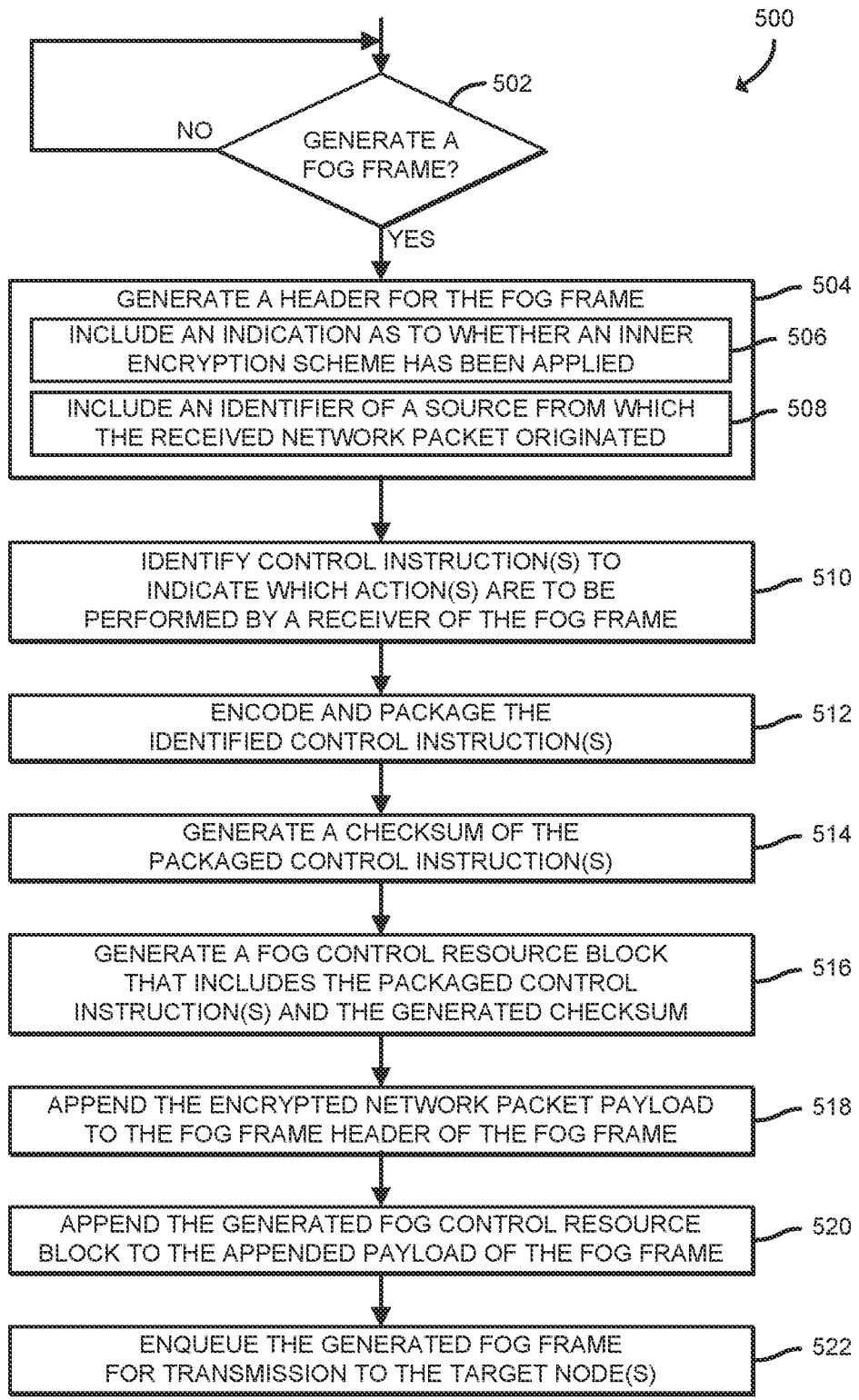
FIG. 5 is a simplified flow diagram of at least one embodiment of a method for generating a fog frame that may be executed by the fog node of FIG. 3.

Referring now to FIG. 5, a method 500 for generating a fog frame is shown which may be executed by a fog node 108 (e.g., the fog node 108*b* of FIG. 8). The method 500 begins with block 502, in which the fog node 108 determines whether a fog frame is to be generated in response to having received a network packet (e.g., from the device edge network computing device 104 of FIG. 1). If so, the method 500 advances to block 504, in which the fog node 108 generates a header for the fog frame. In block 506, the fog node 108 includes an indication as to whether an inner encryption scheme is enabled, or is to be applied, in a field of the header. Additionally, in block 508, the fog node 108 includes an identifier of a source (e.g., the endpoint computing node 102 of FIG. 1) from which the received network packet originated in another field of the header.

In block 510, the fog node 108 identifies one or more control instructions to indicate which one or more corresponding actions are to be performed by a receiving node 108 of the generated fog frame. As described previously, the control instructions may include any information usable by the receiving fog nodes 108 to execute decision logic for dynamically controlling fog frames in-transit through the fog network 106. In block 512, the fog node 108 encodes the identified control instruction(s) and packages the encoded control instruction(s). In block 514, the fog node 108 generates a checksum of the packaged control instruction(s). In block 516, the fog node 108 generates a fog control resource block that includes the packages control instruction(s) and the generated checksum. In block 518, the fog node 108 appends the encrypted network packet payload (i.e., as a result of the inner/outer encryption schemes described in the method 400 of FIG. 4) to the fog frame header. In block 520, the fog node 108 appends the generated fog control resource block to the appended payload of the fog frame. In block 522, the fog node 108 enqueues the generated fog frame into an applicable transmission queue for transmission to one or more target nodes, which is illustratively described in the method 600 of FIG. 6.

Figure 6:
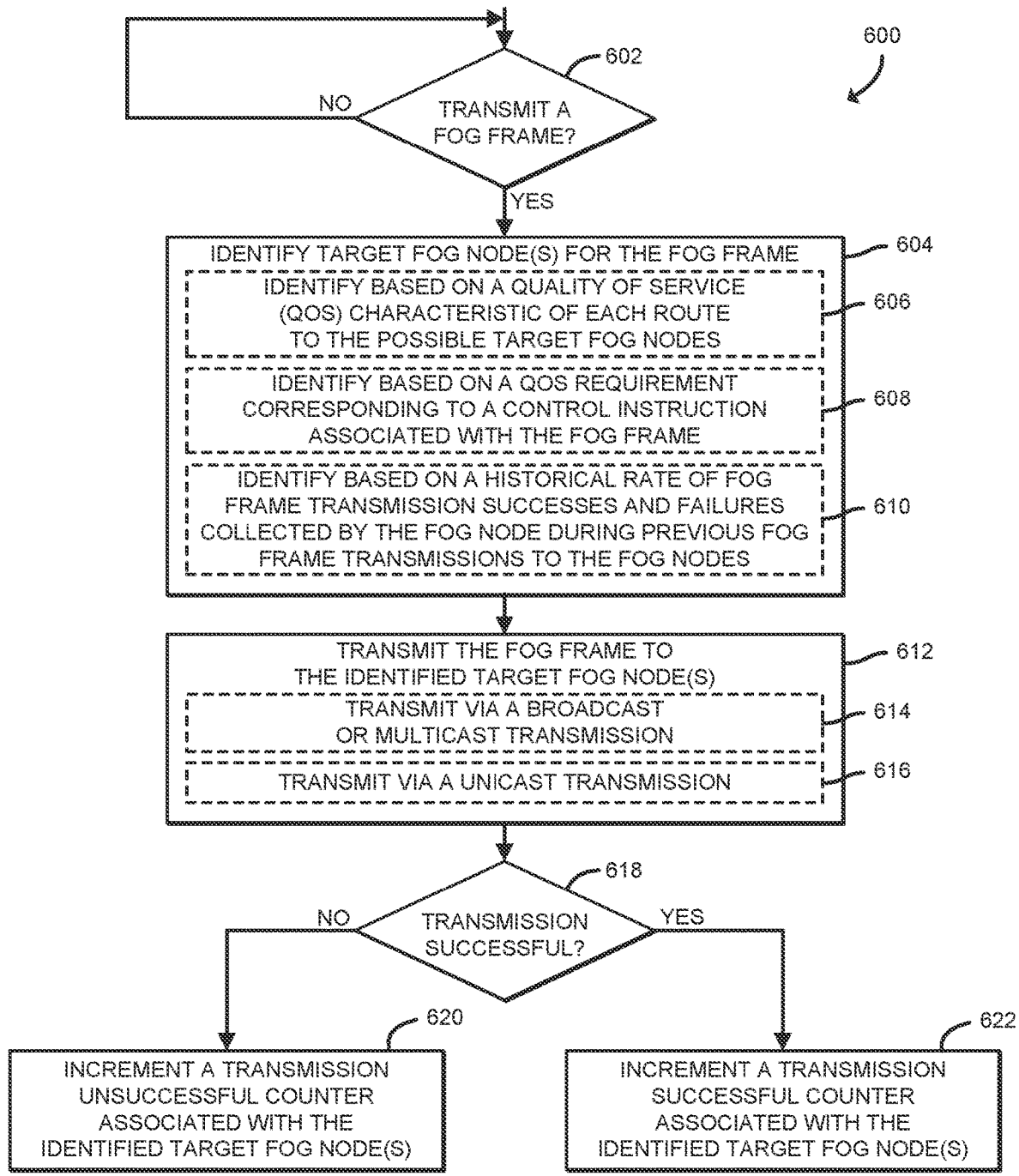
FIG. 6 is a simplified flow diagram of at least one embodiment of a method for transmitting a fog frame that may be executed by the fog node of FIG. 3.

Referring now to FIG. 6, a method 600 for transmitting a fog frame is shown which may be executed by a fog node 108 (e.g., the fog node 108*b* of FIG. 8). The method 600 begins with block 602, in which the fog node 108 determines whether a fog frame is to be transmitted (e.g., in response to having been enqueued in a fog frame transmission queue of the fog node 108). If so, the method 600 advances to block 604, in which the fog node 108 identifies one or more target fog nodes for the fog frame. For example, in block 606, the fog node 108 may identify the target fog node(s) based on a QoS characteristic of each route/path to the possible target fog node(s). Additionally or alternatively, in block 608, the fog node 108 may identify the target fog node(s) based on a QoS requirement corresponding to a control instruction associated with the fog frame. In some embodiments, in block 610, the fog node 108 may identify the target fog node(s) based on a historical rate of fog frame transmission success, or failure, (i.e., a historical transmission success rate) based on transmission success or fail metrics collected by the fog node 108 during previous fog frame transmissions to the fog nodes.

In block 612, the fog node 108 transmits the fog frame to the identified target fog node(s). To do so, in block 614, the fog node 108 may transmit the fog frame via a broadcast or multicast transmission to the identified target fog node(s). Alternatively, in block 616, the fog node 108 may transmit the fog frame via a unicast transmission. In block 618, the fog node 108 determines whether the transmission of the fog frame was successful (e.g., by receiving a response or an acknowledgement message from the receiving fog node 108). For example, in some embodiments, the receiving fog node 108 may not accept the fog frame and drop the fog frame upon receipt (e.g., based on the control instructions).

If the transmission of the fog frame was not successful, the method 600 branches to block 620, in which the fog node 108 increments a transmission unsuccessful counter associated with the target fog node (i.e., one of the identified target fog nodes) to which the fog frame was transmitted to. Otherwise, if the transmission of the fog frame was successful, the method 600 branches to block 622, in which the fog node 108 increments a transmission successful counter associated with the target fog node (i.e., one of the identified target fog nodes) to which the fog frame was transmitted to. It should be appreciated that, in alternative embodiments, the success/failure of transmitted fog frames may be monitored using different counters or other metric collection techniques. For example, the fog node 108 may track the number of transmissions over a period of time to a particular target fog node (e.g., in a transmitted fog frame counter) and the number of successful transmissions over that same period of time to that particular target node (e.g., in the transmission successful counter), which can be used to determine a successful packet delivery rate for that particular target fog node. In such embodiments, the successful packet delivery rate can be used to identify whether that particular target fog node should be used during future transmission attempts (e.g., relative to other target fog node options).

Figure 7:
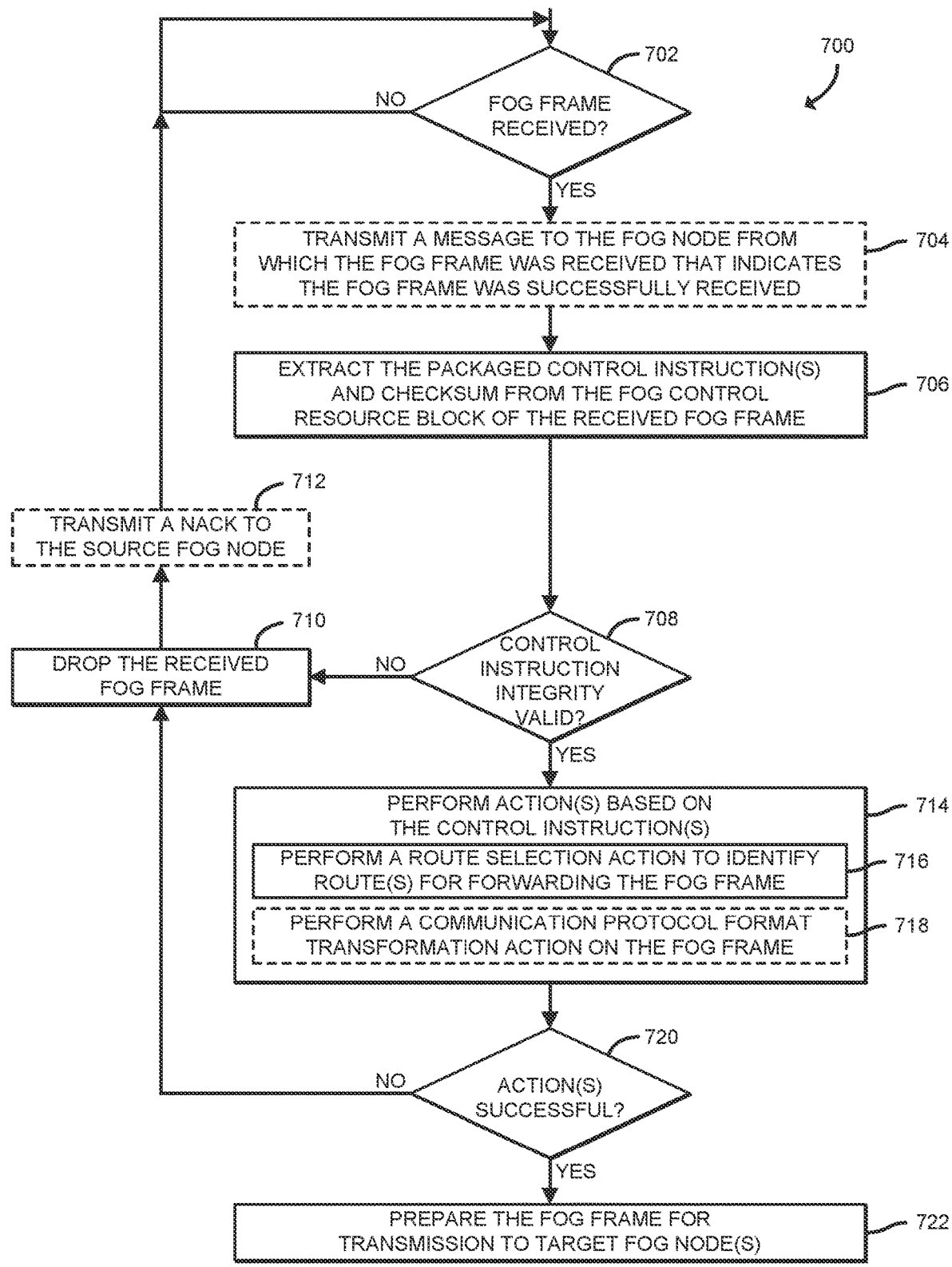
FIG. 7 is a simplified flow diagram of at least one embodiment of a method for processing a received fog frame that may be executed by the fog node of FIG. 3.

Referring now to FIG. 7, a method 700 for processing a received fog frame is shown which may be executed by a fog node 108 (e.g., the fog node 108b of FIG. 8). The method 700 begins with block 702, in which the fog node 108 determines whether a fog frame has been received (e.g., from another fog node 108 in the same or a different fog network segment). If so, the method 700 advances to block 704, in which the fog node 108 may, in some embodiments, transmit a message to the fog node 108 that transmitted the fog frame that indicates the fog frame was successfully received. In block 706, the fog node 108 extracts the packaged control instruction(s) and checksum from the fog control resource block of the received fog frame.

In block 708, the fog node 108 determines whether the integrity of the packaged control instructions has been successfully validated as a function of the extracted checksum. If not, the method 700 branches to block 710, in which the fog node 108 drops the received fog frame. Additionally, in some embodiments, in block 712, the fog node 108 may transmit a negative acknowledgment (NACK) to the source fog node. Otherwise, if the fog node 108 has successfully validated the integrity of the packaged control instructions, the method 700 branches to block 714. In block 714, the fog node 108 performs one or more actions based on the one or more control instructions included in the packaged control instructions. For example, in block 716, the fog node 108 performs a route selection action to identify one or more route(s) for forwarding of the fog frame. In some embodiments, depending on the control instructions, in block 718, the fog node 108 may perform a communication protocol format transformation action on the fog frame. For example, the communication protocol format transformation action may include transforming the fog frame from an IP format to a non-IP format, or vice versa.

In block 720, the fog frame 108 determines whether the action(s) corresponding to the control instruction(s) have been performed successfully. If not, the method 700 branches to block 710, in which, as described previously, the fog node 108 drops the received fog frame. Otherwise, if the fog frame 108 determines that the action(s) corresponding to the control instruction(s) have been performed successfully, the method 700 branches to block 722, in which the fog frame is prepared for transmission to one or more target fog nodes 108. Under certain conditions, the control instructions may be changed depending on the target fog node(s). As such, it should be appreciated that another such action to be performed may be to identify an updated list of control instructions. Accordingly, the fog node 108 may additionally encode and package the updated list of control instructions and perform any necessary fog frame updates (e.g., generate an updated checksum, generate an updated fog control resource block that includes the packaged updated list of control instructions and the updated checksum, etc.) accordingly.

Referring now to FIG. 8, an illustrative fog network architecture 800 is shown that includes multiple heterogeneous fog network segments 802 of the fog network 106. The illustrative heterogeneous fog network segments 802 includes a first fog network segment, designated as fog network segment (1) 802a, a second fog network segment, designated as fog network segment (2) 802b, and a third fog network segment, designated as fog network segment (3) 802c. The illustrative fog network segment (1) 802a is an IP-based secure fog network segment that includes fog node 108a, fog node 108b, and fog node 108c. The illustrative fog network segment (2) 802b is a non-IP based unsecured fog network segment that includes fog node 108d, fog node 108e, fog node 108f, and fog node 108g. The illustrative fog network segment (3) 802c is another IP based secured fog network segment that includes fog node 108h, fog node 108i, fog node 108j, and fog node 108k.

As illustratively shown, the device edge network computing device 104 of FIG. 1 is deployed at an edge network 804 (i.e., the edge between the fog network 106 and an endpoint computing device communicatively coupled to the device edge network computing device 104) and provides a network packet ingress 808 into fog network segment (1) 802a (i.e., via fog node 108b). As described previously, network traffic through the fog network 106 may have more than one egress point. As illustratively shown, the fog network 106 includes a first egress point, designated as fog frame egress point (A) 810, and a second egress point, designated as fog frame egress point (B) 812. The fog frame egress point (B) 812 provides access to the cloud provider 112 of FIG. 1, for example, residing in and accessible via a cloud network 806 (e.g., via a cloud network edge).

In an illustrative example in which a TCP/IP network packet is transmitted from the device edge network computing device 104 to the fog node 108b, the fog node 108b is configured to apply the appropriate outer and inner (if applicable) encryption schemes to the payload of the network packet and append the encrypted payload to fog frame as described herein. Upon receipt, as described previously, the fog node 108b is additionally configured to determine a route along which to transmit the fog frame to the appropriate egress point. As illustratively shown, the fog node 108b may transmit the fog frame to fog node 108a, which can forward the fog frame to fog node 108c, or fog node 108b may transmit the fog frame to fog node 108c directly. As also described previously, the fog node 108b is configured to make such a route selection determination based on various information, including historical transmission success rates collected by the fog node 108b, at least a portion of the information contained in the control instructions (e.g., a priority given to one network characteristic over another), network characteristics of the fog network segment 802 for which the fog frame is to be transmitted to (e.g., whether the network characteristics are the same or different), etc.

Irrespective of the route selected, it should be appreciated that the fog frame reaches fog node 108c. In furtherance of the illustrative example, the fog node 108c determines that the fog frame is to be transmitted to the fog node 108d of fog network segment (2) 802b, which has different network characteristics that fog network segment (1) 802a. For example, fog network segment (2) 802b is a non-IP based fog network which is secured, while fog network segment (1) 802a is an IP based fog network which is unsecured. Accordingly, the fog frame is translated by the fog node 108d into a non-IP format (i.e., based on the appropriate protocol associated with fog network segment (2) 802b) and transmitted to the fog node 108d.

From fog node 108d, the fog frame is forwarded to fog node 108g via fog node 108e or fog node 108, which may be based on a QoS requirement or some other performance requirement. Upon receipt, the fog node 108g determines the next target fog node 108 (i.e., fog node 108h or fog node 108*i*) based on the applicable egress point (i.e., the fog frame egress point (A) 810 accessible via fog node 108*j* or the fog frame egress point (B) 812 accessible via fog node 108*k*), either of which requires the fog node 108*g* to translate the fog frame into an IP packet format. It should be appreciated that during the course of the navigation through the fog network segments 802 of the illustrative fog network 106, additional operations (e.g., control instruction update, path selection, security encryption, etc.) may be performed at one or more of the fog nodes as described herein. Additionally, as also describe herein, each fog node 108 along the illustrative route is configured to track the success rate of the transmissions of the applicable receiving fog nodes 108, such that the results of which can be used to influence future routing decision logic. It should be appreciated that any of the interconnects of FIG. 8 that illustratively communicatively couple two or more computing devices (e.g., the device edge network computing device 104, the fog nodes 108, etc.) may be embodied as wired interconnects, wireless interconnects, or a combination thereof.

EXAMPLES

Illustrative examples of the technologies disclosed herein are provided below. An embodiment of the technologies may include any one or more, and any combination of, the examples described below.

Example 1 includes a fog node deployed in a fog network segment of a fog network for managing network traffic through heterogeneous fog network segments of the fog network, the fog node comprising network traffic ingress/egress management circuitry to (i) receive a fog frame that includes a fog control resource block, wherein the fog control resource block includes packaged control instructions and (ii) extract the packaged control instructions from the received fog frame; control instruction determination circuitry to perform a route selection action to identify a preferred target fog node from one or more target nodes based on the packaged control instructions; control instruction execution circuitry to perform, in response to a determination that the preferred target fog node is deployed in a different fog network segment of the fog network, one or more actions based on the packaged control instructions and one or more network characteristics of the fog network segment relative to a corresponding one or more network characteristics of the different fog network segment; and fog frame construction circuitry to (i) generate updated control instructions based on at least one network characteristic of the different fog network segment and (ii) replace the packaged control instructions of the received fog frame with the updated control instructions, wherein the network traffic ingress/egress management circuitry is further to transmit the received fog frame with the updated control instructions to the preferred target fog node.

Example 2 includes the subject matter of Example 1, and wherein the control instruction determiner circuitry is further to determine whether to allow or block the received fog frame based on the packaged control instructions.

Example 3 includes the subject matter of any of Examples 1 and 2, and wherein the control instruction determiner circuitry is further to validate the packaged control instructions using a checksum included in the fog control resource block before performance of the route selection action.

Example 4 includes the subject matter of any of Examples 1-3, and further including route validation circuitry to monitor whether the received fog frame has been determined to be successfully transmitted to the preferred target fog node; increment, in response to a determination that the transmission to the preferred target fog node was successful, a counter associated with the preferred target fog node; and update a historical transmission success rate based on a value of the counter.

Example 5 includes the subject matter of any of Examples 1-4, and wherein the packaged control instructions include priority information usable to identify a network characteristic to be given priority relative to another network characteristic, and wherein to perform the route selection action comprises to identify a plurality of target fog nodes along potential routes for forwarding the fog frame to an egress point of the fog network; identify network characteristics of an associated fog network segment of the fog network in which each of the plurality of target fog nodes is deployed; and determine the preferred target fog node from the plurality of target fog nodes based on the priority information relative to the identified network characteristics.

Example 6 includes the subject matter of any of Examples 1-5, and wherein the one or more actions to be performed based on the packaged control instructions include to perform a communication protocol transformation from an internet protocol (IP) formatted packet to a non-IP formatted packet or from a non-IP formatted packet to an IP formatted packet.

Example 7 includes the subject matter of any of Examples 1-6, and wherein the one or more network characteristics include at least one of a supported security protocol and a supported communication protocol.

Example 8 includes the subject matter of any of Examples 1-7, and wherein the network traffic ingress/egress management circuitry is further to receive a network packet from a computing device communicatively coupled to an edge network external to the fog network segment in which the fog node is deployed, wherein the fog node further comprises an encryption management circuitry to encrypt at least a portion of a payload of the received network packet using an outer encryption scheme, wherein the control instruction determination circuitry is further to identify one or more control instructions based on at least a portion of the received network packet, wherein the fog frame construction circuitry is further to (i) generate the fog control resource block to include the one or more control instructions and (ii) generate a fog frame that includes the fog control resource block and the encrypted portion of the payload of the received network packet, and wherein the network traffic ingress/egress management circuitry is further to transmit the generated fog frame to a target fog node.

Example 9 includes the subject matter of any of Examples 1-8, and wherein the encryption management circuitry is further to encrypt the encrypted portion of the payload of the received network packet using an inner encryption scheme.

Example 10 includes the subject matter of any of Examples 1-9, and wherein to identify the one or more control instructions further comprises to identify the one or more control instructions based on a plurality of network characteristics of a target fog network segment in which the target fog node is deployed.

Example 11 includes the subject matter of any of Examples 1-10, and wherein the plurality of network characteristics of the target fog network segment include a supported security protocol and a supported communication protocol.

Example 12 includes one or more machine-readable storage media comprising a plurality of instructions stored thereon that, in response to being executed, cause a fog node deployed in a fog network segment of a fog network to receive a fog frame that includes a fog control resource block, wherein the fog control resource block includes packaged control instructions and (ii) extract the packaged control instructions from the received fog frame; perform a route selection action to identify a preferred target fog node from one or more target nodes based on the packaged control instructions; perform, in response to a determination that the preferred target fog node is deployed in a different fog network segment of the fog network, one or more actions based on the packaged control instructions and one or more network characteristics of the fog network segment relative to a corresponding one or more network characteristics of the different fog network segment; generate updated control instructions based on at least one network characteristic of the different fog network segment; replace the packaged control instructions of the received fog frame with the updated control instructions; and transmit the received fog frame with the updated control instructions to the preferred target fog node.

Example 13 includes the subject matter of Example 12, and wherein the plurality of instructions further cause the fog node to determine whether to allow or block the received fog frame based on the packaged control instructions.

Example 14 includes the subject matter of any of Examples 12 and 13, and wherein the plurality of instructions further cause the fog node to validate the packaged control instructions using a checksum included in the fog control resource block before performance of the route selection action.

Example 15 includes the subject matter of any of Examples 12-14, and wherein the plurality of instructions further cause the fog node to monitor whether the received fog frame has been determined to be successfully transmitted to the preferred target fog node; increment, in response to a determination that the transmission to the preferred target fog node was successful, a counter associated with the preferred target fog node; and update a historical transmission success rate based on a value of the counter.

Example 16 includes the subject matter of any of Examples 12-15, and wherein the packaged control instructions include priority information usable to identify a network characteristic to be given priority relative to another network characteristic, and wherein to perform the route selection action comprises to identify a plurality of target fog nodes along potential routes for forwarding the fog frame to an egress point of the fog network; identify network characteristics of an associated fog network segment of the fog network in which each of the plurality of target fog nodes is deployed; and determine the preferred target fog node from the plurality of target fog nodes based on the priority information relative to the identified network characteristics.

Example 17 includes the subject matter of any of Examples 12-16, and wherein the one or more actions to be performed based on the packaged control instructions include to perform a communication protocol transformation from an internet protocol (IP) formatted packet to a non-IP formatted packet or from a non-IP formatted packet to an IP formatted packet.

Example 18 includes the subject matter of any of Examples 12-17, and wherein the one or more network characteristics include at least one of a supported security protocol and a supported communication protocol.

Example 19 includes the subject matter of any of Examples 12-18, and wherein the plurality of instructions further cause the fog node to receive a network packet from a computing device communicatively coupled to an edge network external to the fog network segment in which the fog node is deployed, wherein the fog node further comprises an encryption management circuitry to encrypt at least a portion of a payload of the received network packet using an outer encryption scheme, wherein the control instruction determination circuitry is further to identify one or more control instructions based on at least a portion of the received network packet, wherein the fog frame construction circuitry is further to (i) generate the fog control resource block to include the one or more control instructions and (ii) generate a fog frame that includes the fog control resource block and the encrypted portion of the payload of the received network packet, and wherein the network traffic ingress/egress management circuitry is further to transmit the generated fog frame to a target fog node.

Example 20 includes the subject matter of any of Examples 12-19, and wherein the plurality of instructions further cause the fog node to encrypt the encrypted portion of the payload of the received network packet using an inner encryption scheme.

Example 21 includes the subject matter of any of Examples 12-20, and wherein to identify the one or more control instructions further comprises to identify the one or more control instructions based on a plurality of network characteristics of a target fog network segment in which the target fog node is deployed.

Example 22 includes the subject matter of any of Examples 12-21, and wherein the plurality of network characteristics of the target fog network segment include a supported security protocol and a supported communication protocol.

Example 23 includes a fog node deployed in a fog network segment of a fog network for managing network traffic through heterogeneous fog network segments of the fog network, the fog node comprising circuitry for receiving a fog frame that includes a fog control resource block, wherein the fog control resource block includes packaged control instructions and (ii) extract the packaged control instructions from the received fog frame; means for performing a route selection action to identify a preferred target fog node from one or more target nodes based on the packaged control instructions; means for performing, in response to a determination that the preferred target fog node is deployed in a different fog network segment of the fog network, one or more actions based on the packaged control instructions and one or more network characteristics of the fog network segment relative to a corresponding one or more network characteristics of the different fog network segment; means for generating updated control instructions based on at least one network characteristic of the different fog network segment; means for replacing the packaged control instructions of the received fog frame with the updated control instructions; and circuitry for transmitting the received fog frame with the updated control instructions to the preferred target fog node.

Example 24 includes the subject matter of Example 23, and further including means for monitoring whether the received fog frame has been determined to be successfully transmitted to the preferred target fog node; circuitry for incrementing, in response to a determination that the transmission to the preferred target fog node was successful, a counter associated with the preferred target fog node; and means for updating a historical transmission success rate based on a value of the counter.

Example 25 includes the subject matter of any of Examples 23 and 24, and wherein the packaged control instructions include priority information usable to identify a network characteristic to be given priority relative to another network characteristic, and wherein the means for performing the route selection action comprises means for identifying a plurality of target fog nodes along potential routes for forwarding the fog frame to an egress point of the fog network; means for identifying network characteristics of an associated fog network segment of the fog network in which each of the plurality of target fog nodes is deployed; and means for determining the preferred target fog node from the plurality of target fog nodes based on the priority information relative to the identified network characteristics.

The invention claimed is:

1. An apparatus comprising:
   at least one memory;
   instructions; and
   processor circuitry to execute the instructions to:
   generate a network frame header including an identification of a source of an encrypted network packet and an indication of a first encryption scheme applied to the encrypted network packet;
   apply a second encryption scheme to the encrypted network packet; and
   generate a network frame including encoded network control instructions, a checksum of the encoded control instructions, and the encrypted network packet encrypted with the first and second encryption schemes, the encoded network control instructions to include an identifier of a blocked network protocol and a flag to indicate whether to enable or disable compression associated with network protocol translation.

2. The apparatus of claim 1, wherein the processor circuitry is to execute the instructions to identify a plurality of routes to a network egress point for the encrypted network packet.

3. The apparatus of claim 2, wherein at least one route of the plurality of routes to the network egress point includes at least two heterogenous network protocols.

4. The apparatus of claim 3, wherein the network control instructions include:
   a first control instruction to identify a plurality of target nodes of ones of the plurality of routes; and
   a second control instruction to identify a network characteristic associated with ones of the plurality of target nodes.

5. The apparatus of claim 3, wherein the processor circuitry is to execute the instructions to transmit the network frame through at least two routes of the plurality of routes.

6. The apparatus of claim 3, wherein the processor circuitry is to execute the instructions to identify the plurality of routes based on a quality of service condition associated with the encoded control instructions.

7. The apparatus of claim 2, wherein the processor circuitry is to execute the instructions to identify a destination node for the network frame based on a previous successful transmission of a second network frame to the destination node.

8. The apparatus of claim 4, wherein the first encryption scheme is an inner encryption scheme and the second encryption scheme is an outer encryption scheme selected based on a network policy associated with the encrypted network packet.

9. The apparatus of claim 8, wherein at least one of the inner encryption scheme or the outer encryption scheme is decrypted by one of the plurality of target nodes.

10. The apparatus of claim 2, wherein the network egress point is a network ingress/egress point and the processor circuitry is to execute the instructions to manage a virtual network interface at the network ingress/egress point.

11. A non-transitory computer readable medium comprising instructions which, when executed, cause processor circuitry to:
   generate a network frame header including an identification of a source of an encrypted network packet and an indication of a first encryption scheme applied to the encrypted network packet;
   apply a second encryption scheme to the encrypted network packet; and
   generate a network frame including encoded network control instructions, a checksum of the encoded control instructions, and the encrypted network packet encrypted with the first and second encryption schemes, the encoded network control instructions to include an identifier of a blocked network protocol and a flag to indicate whether to enable or disable compression associated with network protocol translation.

12. The non-transitory computer readable medium of claim 11, wherein the instructions, when executed, cause the processor circuitry to identify a plurality of routes to a network egress point for the encrypted network packet.

13. The non-transitory computer readable medium of claim 12, wherein at least one route of the plurality of routes to the network egress point includes at least two heterogenous network protocols.

14. The non-transitory computer readable medium of claim 13, wherein the network control instructions include:
   a first control instruction to identify a plurality of target nodes of ones of the plurality of routes; and
   a second control instruction to identify a network characteristic associated with ones of the plurality of target nodes.

15. The non-transitory computer readable medium of claim 13, wherein the instructions, when executed, cause the processor circuitry to transmit the network frame through at least two routes of the plurality of routes.

16. The non-transitory computer readable medium of claim 13, wherein the instructions, when executed, cause the processor circuitry to identify the plurality of routes based on a quality of service condition associated with the encoded control instructions.

17. The non-transitory computer readable medium of claim 14, wherein the first encryption scheme is an inner encryption scheme and the second encryption scheme is an outer encryption scheme selected based on a network policy associated with the encrypted network packet.

18. The non-transitory computer readable medium of claim 17, wherein at least one of the inner encryption scheme or the outer encryption scheme is decrypted by one of the plurality of target nodes.

19. The non-transitory computer readable medium of claim 13, wherein the network egress point is a network ingress/egress point and wherein the instructions, when executed, cause the processor circuitry to manage a virtual network interface at the network ingress/egress point.

20. A method comprising:
   generating a network frame header including an identification of a source of an encrypted network packet and an indication of a first encryption scheme applied to the encrypted network packet;
   applying a second encryption scheme to the encrypted network packet; and
   generating a network frame including encoded network control instructions, a checksum of the encoded control instructions, and the encrypted network packet encrypted with the first and second encryption schemes, the encoded network control instructions to include an identifier of a blocked network protocol and a flag to indicate whether to enable or disable compression associated with network protocol translation.

21. The method of claim 20, further including identifying a plurality of routes to a network egress point for the encrypted network packet.

22. The method of claim 21, wherein the network control instructions include:
 a first instruction identifying a plurality of target nodes of ones of the plurality of routes; and
 a second instruction identifying a network characteristic associated with ones of the plurality of target nodes.

23. The method of claim 21, further including identifying the plurality of routes based on a quality of service condition associated with the encoded control instructions.

24. The method of claim 21, wherein the first encryption scheme is an inner encryption scheme and the second encryption scheme is an outer encryption scheme selected based on a network policy associated with the encrypted network packet, and wherein at least one route of the plurality of routes to the network egress point includes at least two heterogenous network protocols.

\* \* \* \* \*